United States Patent Office 2,876,414
Patented Mar. 3, 1959

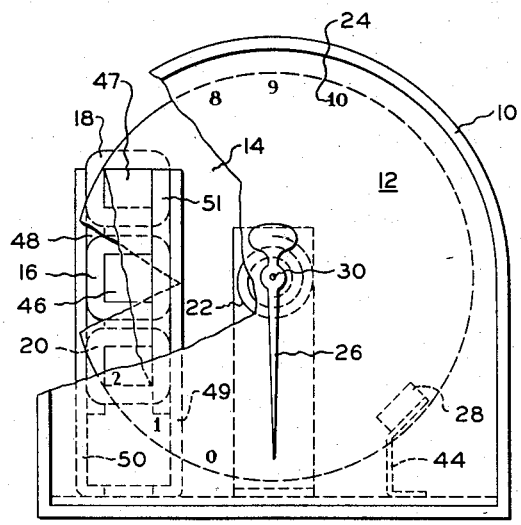

2,876,414

ELECTROMECHANICAL APPARATUS AND PROCESS ASSOCIATED THEREWITH

John Shaheen, West Roxbury, Mass.

Application November 8, 1955, Serial No. 545,655

1 Claim. (Cl. 324—30)

The present invention relates to electromechanical instrumentation and more particularly, to an electromechanical system useful in a variety of meters, especially meters for determining the conductivity of solutions in order to indicate or control their detergency for washing, their salinity for drinking, etc.

The present invention contemplates a novel electromechanical measuring and indicating device comprising relatively few components which, notwithstanding their ruggedness and simplicity, retain good sensitivity throughout an unusually wide range of response. The device comprises a rotatable electrically conducting disk which is subjected to a driving torque by out-of-phase alternating magnetic fluxes generated in a plurality of coils, and which may be subjected to a restraining bias by such means as a helical spring. Preferably, at least one of the coils is energized through a transformer, which may be variable to permit control over the sensitivity range. When the device indicates zero, the coils are energized by steady alternating currents which give rise to a driving torque that is just balanced by the restraining bias. However, the circuit of at least one of the coils is provided with a pair of test terminals which, when crossed by an impedance to be measured, alters the asymmetrical character of the overall magnetic flux field so as to vary the driving torque. The resulting rotation of the disk is a function of the impedance crossing the test terminals. The disk is free to rotate through 360° or more to permit calibration of exceptional accuracy and clarity, and is capable of developing enough torque to actuate a control system without servo amplification. The device, which retains good sensitivity when measuring very low impedance, is especially useful in determining the conductivity of solutions, which are best measured with alternating currents to avoid the effect of the electromotive force of polarization. The device, which can develop an alternating current across a pair of test terminals predeterminedly spaced apart for this purpose, may be plugged into a commercial alternating current source without necessitating any rectification in its circuit whatsoever.

Accordingly, objects of the present invention are: to provide an electromechanical measuring and indicating device comprising an electrically conducting disk, a plurality of coils energized by a circuit supplied with a steady alternating current for applying a driving torque to the disk, a restraining bias for countering the driving torque, and a pair of test terminals in the circuit, whereby a predetermined impedance across the test terminals causes a predetermined rotation of the disk; to provide in a device of the foregoing type a variable transformer through which at least one of the coils is energized; and to measure the conductivity of a solution with a device of the foregoing type having connected to the test terminals a pair of test prods that are predeterminedly spaced apart in functional relationship with the meter calibration.

Other objects of the present invention will in part be obvious and will in part appear hereinafter.

The invention accordingly comprises the product possessing the properties, features and relation of components which are exemplified in the following detailed disclosure and the process involving the several steps and the relation and order of one or more of such steps with respect to each of the others which are exemplified in the following detailed disclosure, and the scope of the application of which will be indicated in the claim.

For a fuller understanding of the nature and objects of the invention, reference should be had to the following detailed description taken in connection with the accompanying drawing wherein:

Figure 1 is a fragmentary front elevation of a meter embodying the present invention; and Fig. 2 is a schematic diagram of the mechanical and electrical components of the meter of Fig. 1.

The basic components of the illustrated meter are mounted in and enclosed by a housing 10, the open face of which is fitted with a glass window 12. These components include an electrically conducting, rotatable disk 14, an inner coil 16 and a pair of outer coils 18 and 20 for generating out of phase alternating magnetic fluxes which apply torque to the disk, a helical spring 22 which resists the torque applied to the disk, a suitably calibrated scale 24 visible through the window, a pointer 26 rotatable with the disk for coaction with the scale, and a permanent magnet 28 for damping rotation of the disk.

Disk 14 preferably is composed of a non-magnetic metal such as aluminum or copper. Extending through the center of disk 14 is a shaft 30. The opposite ends of this shaft preferably are journaled on jewel bearings in the upright legs 32 and 34 of a U-shaped element which has a bight 38 that is secured to the base of housing 10. Spring 22 is connected between leg 32 and a collar 40 affixed to shaft 30. A collar 42, affixed to shaft 30, orients disk 14 on shaft 30. The forward end of shaft 30 extends through scale 24, which is affixed to leg 32, and carries pointer 26. Damping magnet 28 is carried by a bracket 44, which is supported on the base of housing 10.

Coils 16, 18 and 20 are wound on the projections of an E-shaped laminated iron core 46. A laminated iron bar 47, serving as a return path for the magnetic flux, is aligned with and adjacent to the free ends of the projections of iron core 46, with disk 14 interposed between the bar and the free ends of the projections. The bight of core 46 is carried by an insulating spacer 48. This spacer is affixed to a standard 50 which is mounted on the base of housing 10. Bar 47 is carried by a bracket 49 from which it is separated by an insulating spacer 51. So-called potential coil 16, which has a relatively large number of turns, is connected by leads 52 and 54 across the terminals 56 and 58 of a power supply line 60. So-called current coils 18 and 20, each of which has a relatively small number of turns, are energized through a variable transformer 64, the primary of which is connected across terminals 56 and 58. Coils 18 and 20 are connected together by a lead 66 in a series loop which includes in sequence a lead 68, the secondary of transformer 64, a lead 70, a variable resistor 72, a pair of test terminals 74 and 76, and a lead 78. A variable resistor 80 is shunted across test terminals 74 and 76. The current through coils 18 and 20, which is substantially in phase with the voltage across them by virtue of their low inductance, is in quadrature with the current through coil 16, which is substantially 90° out-of-phase with the current across it by virtue of its high inductance. The result is an assymetrical alternating magnetic field which applies a torque to disk 14. This torque may be adjusted by variable resistor 80 until it balances the restraining bias of spring 22 for a zero reading of pointer 26 on scale 24. This torque may be limited to a predetermined maximum by shorting test terminals 74 and 76 and adjusting variable resistor 72 which limits the flow of current between the test terminals.

Test terminals 74 and 76 are designed to be connected to a suitable pair of test prods. Where the meter is to be used to measure the conductivity of a solution, a pair of predeterminedly spaced prods, of the type shown in Fig. 2 at 82 and 84, are used. These prods are embedded in an insulating handle 86. The distance between these prods, in the illustrated device, is functionally related to the calibrations on scale 24 so that a direct reading of concentration in the solution is possible.

The operation of the meter is extremely simple. Line 60 is plugged into a commercial alternating current source, variable resistor 80 is adjusted until pointer 26 reads zero, and variable resistor 72 is adjusted, with test terminals 74 and 76 shorted, until pointer 26 reads maximum on scale 24. The sensitivity of the meter may be varied, by means of variable transformer 64, from one range to other ranges, all of which are printed on scale 24. Thereafter, the meter gives an immediate indication of concentration when test prods 82 and 84 are inserted into a solution. Because of its rugged components and lack of sensitive adjustment, the meter is of outstanding durability.

Since certain changes may be made in the above apparatus and process without departing from the scope of the invention herein involved, it is intended that all matter contained in the above description and shown in the accompanying drawing shall be interpreted in an illustrative and not in a limiting sense.

I claim as my invention:

In an electromechanical device for indicating the strength of a solution, the combination which comprises a pair of spaced conducting prods, an electro-magnet having a three-legged core and having a coil on each of the three legs of the core, the coil on the middle one of said legs being a potential coil and the coil on each of the other two legs of the core being a current coil, all of said coils being adapted to be energized by alternating current, a variable transformer adapted to be connected to a source of alternating current and having its secondary connected in series with said two current coils and with said pair of spaced conducting prods, said potential coil being directly connected to said source current, an induction disk of non-magnetic material rotatably mounted in position to be influenced by the magnetic field produced by the said electro-magnet and to be biased in one direction, more or less, depending upon the magnitude of the current at any time passing through the said current coils, the strength of the said bias varying with changes of impedance to flow of current between the two said prods, when the prods are immersed in a solution whose strength is to be determined, a spring means attached to said disk and biasing the disk in opposition to the force exerted on the disk by the said electro-magnet, an indicator rotatable with said disk, and a scale fixed relative to said indicator along which scale said indicator moves in response to biased rotation of said disk.

References Cited in the file of this patent
UNITED STATES PATENTS

| | | |
|---|---|---|
| 530,351 | Scheeffer | Dec. 4, 1894 |
| 870,632 | Lea | Nov. 12, 1907 |
| 1,289,102 | Bradshaw | Dec. 31, 1918 |
| 1,566,902 | Ciffrinowitsch | Dec. 22, 1925 |
| 1,915,095 | Jump | June 20, 1933 |
| 2,150,015 | Witham | Mar. 7, 1939 |
| 2,281,470 | Wright | Apr. 28, 1942 |
| 2,446,015 | Lehde | July 27, 1948 |
| 2,778,989 | Miller | Jan. 22, 1957 |